Aug. 28, 1956  K. J. KNUDSEN  2,761,052
ELECTRIC TEMPERATURE CONTROL
Filed Dec. 23, 1952  3 Sheets-Sheet 1

INVENTOR
Knud J. Knudsen

BY Johnson and Kline
ATTORNEYS

INVENTOR
Knud J. Knudsen

BY Johnson and Kline
ATTORNEYS

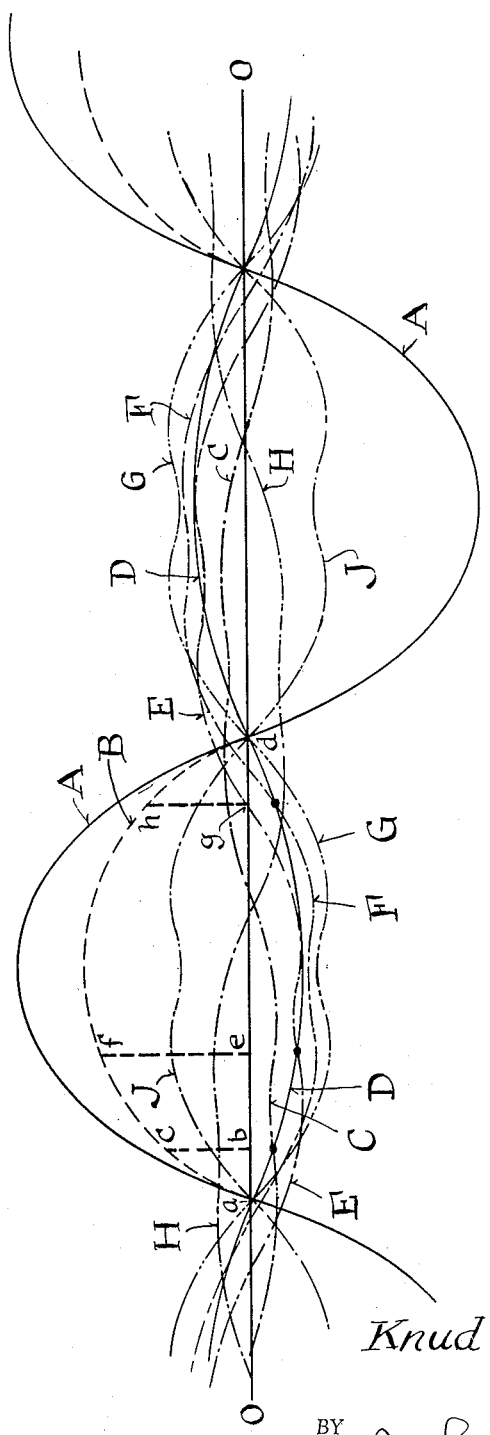

United States Patent Office 2,761,052
Patented Aug. 28, 1956

2,761,052

ELECTRIC TEMPERATURE CONTROL

Knud J. Knudsen, Naugatuck, Conn., assignor to The Lewis Engineering Company, Naugatuck, Conn., a corporation of Connecticut Application December 23, 1952, Serial No. 327,551

7 Claims. (Cl. 219—20)

This invention relates to automatic electrical temperature controlling devices, and more particularly to devices for controlling the temperature of electrically heated oil or other liquid baths such as are widely used in industries.

An object of the invention is to provide an improved automatic temperature controlling apparatus for a liquid bath or the like, wherein the temperature of the bath is held to extremely close limits despite alternate energization and de-energization of the heater for the bath.

Another object of the invention is to provide an improved temperature-control apparatus as above set forth, in which overshooting of the temperature during the energizing cycle of the heater is greatly minimized if not completely eliminated.

A still further object of the invention is to provide an improved automatic temperature control employing a thermionic tube as a circuit control, in which the wave shape in the anode circuit of the circuit control is made less abrupt when the control is functioning to close the circuit, thereby minimizing undesirable surges and eliminating excessive loading in the heating circuit.

Yet another object of the invention is to provide an improved automatic temperature control as characterized above, which is relatively simple, economical to fabricate, and reliable in its operation at all times.

A still further object of the invention is to provide an improved temperature control having a thermionic circuit control, in which relatively heavy load currents may be readily controlled in a simple and reliable manner with lighter anode currents in the circuit of the thermionic tube.

Other features and advantages will hereinafter appear.

In the accompanying drawings:

Fig. 5 is a diagram showing curves representing the anode voltage and current in the thermionic tube circuit control of Fig. 3.

Figure 1:
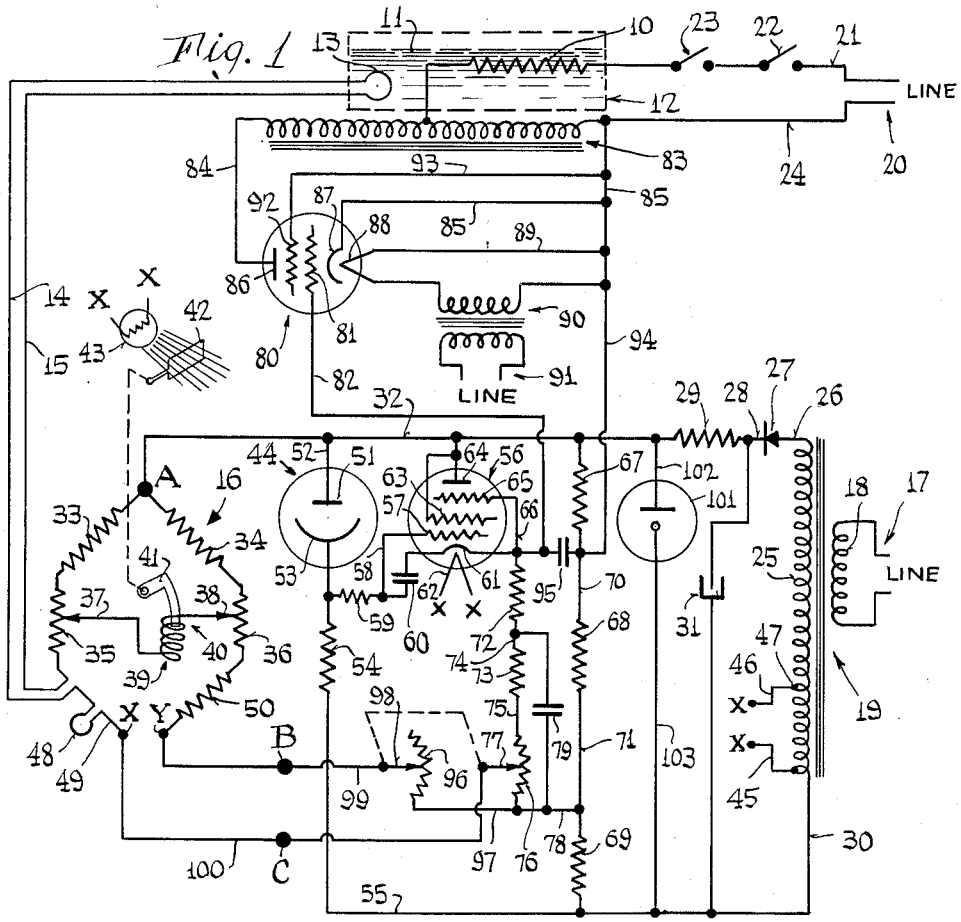
Figure 1 is a schematic diagram of a temperature control made in accordance with the invention, utilizing a resistance bridge, a galvanometer controlled shutter and a light cell in conjunction with the thermionic circuit control.

Referring to Fig. 1, the temperature control of this invention comprises an electric heater 10 immersed in an oil bath 11 contained in a tank 12 (shown diagrammatically by a dotted rectangular outline). Also immersed in the oil bath 11 is a temperature sensing or heat-responsive element 13 such as a resistance bulb, the bulb 13 being connected by wires 14 and 15 with a resistance bridge indicated generally by the character 16.

Energy for the bridge 16 is provided from a power line 17 connected to the primary 18 of a transformer 19, and energy for the heater 10 is supplied from a power line 20 having one lead 21 connected to an over-temperature safety cutout switch 22 which is in turn connected to a time delay switch 23. The power line 20 has a second conductor 24, and may for example be single phase 110 volt A. C. Both the lines 17 and 20 may be connected together and fed from a single source.

The transformer 19 has a secondary 25 one terminal of which is connected by a wire 26 with a rectifier unit 27, the latter being connected by a wire 28 to a current-limiting resistor 29 which may be advantageously on the order of 2,000 ohms resistance. The other terminal of the secondary 25 may be connected to a negative or return wire 30 through which current supplied to the bridge 16 flows.

Between the wires 28 and 30 a filter condenser 31 is connected, said condenser being on the order of 100 microfarads, 200-volt breakdown test. The voltage of the line 17 being for example 110, the secondary voltage of the transformer 19 may be on the order of 135 volts, with a capacity of 50 milliamperes or better.

From the current-limiting resistor 29 a wire 32, representing the positive supply for the bridge 16, leads to a terminal A of said bridge. The bridge 16 has resistance legs 33 and 34, one end each of which is connected to the bridge terminal A. The resistors 33 and 34 may advantageously be of 20,000 ohms resistance each. The other ends of the resistors 33 and 34 are connected to balancing resistors or potentiometers 35 and 36 having sliders 37 and 38 connected to a coil 39 of a galvanometer 40, the latter having an armature 41 carrying a shutter 42.

A source of light comprising an electric bulb 43 is provided to shine against the shutter 42 and be either obstructed thereby or, when the shutter is displaced, allowed to pass and strike a photoelectric tube 44. The lamp 43 has filament terminals X, X which may be connected to correspondingly marked terminals on the transformer 19, one of said terminals being connected by a wire 45 to the wire 30 and the other terminal being connected by a wire 46 to a tap 47 which may provide six volts potential for energizing the lamp 43.

The resistance bulb 13 constitutes a third leg of the bridge 16, being connected by the wire 15 with the balancing resistor 35, and by the wire 14 with a second resistance bulb 48 (for ambient compensation) which is in turn connected by a wire 49 to a terminal X on the resistance bridge. The balancing resistor 36 is connected to a resistor 50 constituting a fourth leg of the bridge 16, said resistor 50 being connected to a terminal Y of the bridge 16.

The resistance bulbs 13 and 48 may advantageously have a combined value on the order of 90 ohms, equaling that of the resistor 50 in the fourth leg of the bridge 16, and with the resistors 33 and 34 of substantially identical ohmage the bridge 16 may be balanced by adjustment of the slides 37 and 38, presuming that the terminals X and Y of the bridge have the same potential (which for example may be accomplished for temporary test purposes by connecting these terminals to each other).

The photocell 44 may have its collector 51 connected by a wire 52 to the positive wire 32 of the bridge supply, and may have its emitter 53 connected through a current-limiting resistor 54 to a wire 55 which is in turn connected to the negative supply wire 30. The resistor 54 may for example have a value of 15 megohms, and the photocell 44 may be of the type known to the trade at No. 925. As thus connected, the cell 44 is not conducting when no light is supplied to it, and when light is supplied to the cell from the lamp 43 the cell is rendered conducting.

The galvanometer 39 is so arranged that when the bridge 16 is in balance, light will be withheld from the photocell 44 by virtue of its being obstructed by the shutter 42. Unbalance of the bridge 16 due to a fall in the temperature of the resistance bulb 13 will result in deflection of the galvanometer and shifting of the shutter 42 out of its obstructing position. The light from the lamp 43 will then strike the photocell 44 and render it conducting. When the bridge 16 is again brought into balance the shutter 42 will obstruct the light from the lamp 43 and the photocell 44 will again be rendered nonconducting.

Responding to the conducting condition of the photocell 44 is a vacuum tube pentode 56 having a control grid 57 connected by a wire 58 and a resistor 59 to the emitter 53 of the photocell 44. A grid condenser 60 is connected to the wire 57 and to the cathode 61 of the tube 56. The cathode 61 has heat supplied to it by a heater 62, energized from the terminals X, X of the transformer 19. The pentode 56 has one grid 63 and its anode 64 connected to the positive supply wire 32, and has a third grid 65 connected by a wire 66 to its cathode 61. The cathode 61 is connected to be energized from the negative supply wire 30 in the following manner. A voltage divider is connected between the positive and negative leads 32 and 30, said divider comprising resistors 67, 68 and 69 joined in series by wires 70 and 71. The remaining end of the resistor 67 is connected to the wire 32, and the remaining end of the resistor 69 connected to the wire 30. The wire 66 joined to the cathode 61 is connected to cathode resistors 72 and 73 which are joined in series by a wire 74. The resistor 73 is connected by a wire 75 to a resistor 76 in the form of a potentiometer having a slider 77, the resistor 76 being connected by a wire 78 to the wire 71.

The resistor 76 and slider 77 comprising the potentiometer is in the cathode-anode circuit of the tube 56 and constitute part of a novel anticipator means provided by the present invention, as will be more fully described later. The resistors 67, 68, 69, 72, 73 and 76 may advantageously have the following values respectively: 7500 ohms; 2700 ohms; 390 ohms; 20,000 ohms; 20,000 ohms; and 15 ohms. It will be understood that the cathode 61 of the pentode 56 is thus connected through the resistors 72, 73 and 76 to the wire 71 of the voltage divider comprising the resistors 67, 68 and 69, and because of the relative values of the resistors making up the voltage divider, the potential of the wires 78 and 71 will be very nearly that of the negative supply wire 30, thereby providing a negative connection for the cathode 61 through the cathode resistors 72 and 73. A bypass condenser 79 is connected between the wires 74 and 78.

Normally when the photocell 44 is in nonconducting condition a negative bias will be supplied to the control grid 57 of the pentode 56, through the resistor 59 and 54, such bias being on the order of minus 7.8 volts measured with respect to the cathode 61. Bearing in mind that the anode 64 of the pentode 56 has a positive potential from the supply wire 32 it will be understood that whenever the photocell 44 is rendered conducting by virtue of its receiving light from the lamp 43 the potential of the emitter 53 of the photocell will be made more positive, thereby making more positive the control grid 57 of the pentode and rendering the latter conducting. Whenever the photocell 44 is deprived of light, rendering it nonconducting, the negative bias will be re-established on the control grid 57 of the pentode 56 causing the latter to become nonconducting.

The pentode 56 is utilized as a relay to actuate a circuit control 80 by which energization of the heater 10 is controlled. This circuit control may be any suitable device, that shown in Fig. 1 comprising a Thyratron vacuum tube having a control grid 81 connected by a wire 82 to the wire 66 which is joined to the cathode 61 of the pentode 56.

In accordance with the invention, advantageous and effective control of relatively heavy current through the heater 10 may be effected by the Thyratron 80, by the provision of an autotransformer 83 supplying energy to the Thyratron. The transformer 83 has its end terminals connected to wires 84 and 85 which are respectively joined to the anode 86 and cathode 87 of the Thyratron. The Thyratron heater 88 is also connected to the wire 85 by a wire 89, and is energized from a transformer 90 connected to a supply line 91 which may be joined to the supply lines 17 and 20. A screen grid 92 of the Thyratron 80 is connected by a wire 93 to the wire 85, and the cathode 87 is connected to a point on the voltage divider comprising the resistors 67, 68 and 69, by virtue of the wire 85 being connected to the wire 70 by a wire 94. A grid condenser 95 is connected between the wires 94 and 82.

It will be understood that the cathode 87 of the tube 80 will have a positive potential impressed on it by virtue of the connection to the voltage divider through the wire 94, with respect to the control grid 81 which is connected to another point on the voltage divider through the wire 82 and the resistors 72, 73 and 76, whenever the pentode 56 is nonconducting. For such condition, the potential of the wire 82 and grid 81 will be substantially that of the wire 71 of the voltage divider, and such potential will be negative with respect to the wire 70 of the voltage divider, to which the cathode 87 is connected through the wire 94. Accordingly when the pentode 56 is not conducting, the negative bias on the grid 81 will prevent the tube 80 from conducting. The cathode 87 and anode 86 of the tube 80 are energized by alternating current by virtue of their connection to the autotransformer 83. During the periods that the anode is negatively charged the tube 80 cannot conduct; during the periods that the anode 86 is positively charged the tube 80 can conduct if the control grid 81 is not biased negatively with respect to the cathode 87. Such condition results whenever the pentode 56 is made conducting, for at such times the potential on the cathode 61 of the pentode is raised greatly, resulting in the control grid 81 of the tube 80 becoming positive with respect to the cathode 87.

Whenever the Thyratron tube 80 is conducting it virtually short circuits the autotransformer 83 causing the heater 10 to be energized from the line 20.

From the foregoing explanation it will be understood that whenever light from the lamp 43 strikes the photocell 44 it will render the latter conducting, this will render the pentode 56 conducting, and this in turn will render the Thyratron 80 conducting, causing energization of the heater 10. Also, whenever light is shut off from the photocell 44 by the shutter 42, the photocell 44, pentode 56 and Thyratron 80 will be rendered nonconducting, resulting in a de-energization of the heater 10.

According to the present invention I provide means to prevent overshooting of the temperature of the bath 11 whenever the heater 10 is being energized in accordance with the above action. I term this means an anticipator, since it in effect anticipates an overshooting and alters the circuit to prevent the same from occurring. The anticipator means comprises the resistor 76 and slider 77, and also comprises a resistor or potentiometer 96 connected by a wire 97 to the wire 78, said potentiometer having a slider 98 connected by a wire 99 with the bridge terminal Y. The slider 77 of the resistor 76 is connected by a wire 100 to the bridge terminal X, and in the wires 99 and 100 terminals or separable connections B and C are provided for a purpose to be hereinafter described. A cold cathode glow discharge tube 101 is provided, connected by wires 102 and 103 respectively to the wires 32 and 30, to regulate the voltage of the wire 30 and 32.

The sliders 77 and 98 are mechanically coupled together as indicated in the diagram, and the resistance of the resistor 96 is preferably 15 ohms, the same as that of the resistor 76. With the sliders 77 and 98 at some intermediate point on the resistors 76 and 96 an automatic alteration of the influence of the resistance bulb 13 on the bridge 16 is had whenever the pentode 56 is rendered conducting, for the following reason: Considering the case when the pentode is not conducting, since the settings of the sliders 77 and 98 are always identical there will be equal resistances inserted in the lower legs of the bridge 16 by virtue of the inclusion in these legs of portions of the resistors 76 and 96. Accordingly, the points X and Y will normally have the same potential when the bridge 16 is in balance. As soon as the oil bath 11 cools off, lowering the resistance of the bulb 13, the bridge will unbalance by virtue of more current flowing in the left side of the bridge, reducing the potential of the terminal X. When the unbalance is sufficient to enable light to impinge on the photocell 44 the latter and the pentode 56 will be rendered conducting. Prior to such conduction the cathode 61 of the pentode had virtually the same potential as the terminal X of the bridge 16. However when the pentode 56 is conducting, the current flowing through the cathode resistors 72 and 73 results in the potential of the slider 77, wire 100 and terminal X of the bridge 16 being raised slightly, but not enough to immediately re-establish the balance of the bridge 16. Thus, less rise in temperature of the resistance bulb 13 is required to re-establish the balance of the bridge than would be required if the anticipator device comprising the resistors 76 and 96 were not incorporated in the circuit. It will be seen that the anticipator when functioning reduces the unbalance of the bridge, by introducing a potential in the bridge circuit. As a consequence I have found that the provision of this anticipator device prevents an overshooting of the temperature of the bath 11 during the intervals of energization of the heater 10, and accordingly a more constant temperature of the bath is maintained, that is, the temperature is held in a narrower range. The amount or degree of anticipation may be varied by changing the position of the sliders 77 and 98, and it will be apparent that this will not have any tendency to effect the state of balance or unbalance of the bridge 16, since equal resistances are added or removed from the two lower legs of the bridge. The purpose of the resistance bulb 48 is to compensate for changes in ambient temperature, as is well understood.

Figure 2:
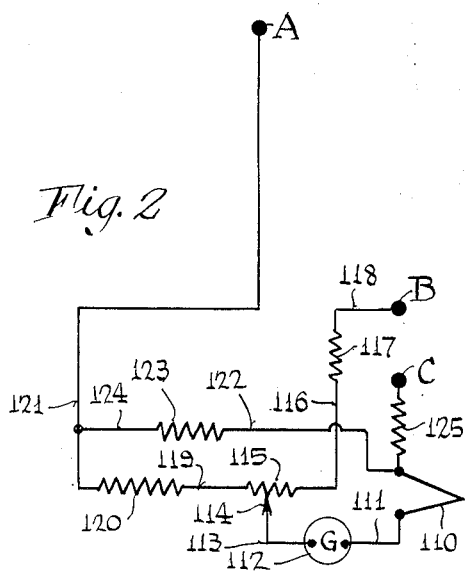
Fig. 2 is a schematic diagram of a thermocouple network which may be substituted for the resistance bridge in the circuit of Fig. 1.

While I have shown in Fig. 1 a resistance bridge using a resistance bulb, a thermocouple with a suitable resistor network may be substituted for the resistance bridge. In Fig. 2 a thermocouple circuit is shown which may be substituted for the bridge 16 by disconnecting the terminals A, B and C of the bridge 16 and connecting these points of the apparatus to the terminals A, B and C of the thermocouple circuit. In this figure a thermocouple 110 has one terminal connected by a wire 111 to a trigger device or circuit comprising a galvanometer 112 which is similar to the galvanometer 39 shown in Fig. 1. The other terminal of he galvanometer 112 is connected by a wire 113 to a slider 114 of a resistor or potentiometer 115. A wire 116 connects the resistor 115 to a copper-wire resistor 117 for purposes of ambient temperature compensation, the resistor 117 being connected by a wire 118 to the terminal B. The resistor 115 is connected by a wire 119 to a resistor 120 which is connected by a wire 121 to the terminal A. The thermocouple 110 is connected by a wire 122 to a resistor 123 which is connected by a wire 124 to the wire 121. Also a resistor 125 is connected between the thermocouple 110 and the terminal C. The values of the resistors 115, 117, 120, 123 and 125 may advantageously be respectively as follows: 10 ohms; 2 ohms; 20,000 ohms; 20,000 ohms; and 2 ohms.

Preferably the resistor 117 is made of Constantan whereby, in conjunction with the resistor 125, it effects compensation for changes in ambient temperature.

The operation of the apparatus when incorporating the circuit of Fig. 2 in place of the resistance bridge is substantially the same as described above. The thermocouple will be in an energized circuit fed by the wires 32 and 30, and a lowering of the temperature of the thermocouple 110 will decrease its potential, causing deflection of the galvanometer 112. The resultant operation of the pentode 56 will have the effect of a shunt in the energized D. C. circuit connected to the thermocouple, and will alter the influence of the thermocouple 110 by altering the potential or energization of the said energized D. C. circuit, raising the potential of the wire 122 slightly, not enough to restore the galvanometer to its initial position but sufficiently to cause said restoration to occur prior to the temperature of the thermocouple 110 being completely restored.

Figures 3, 4:
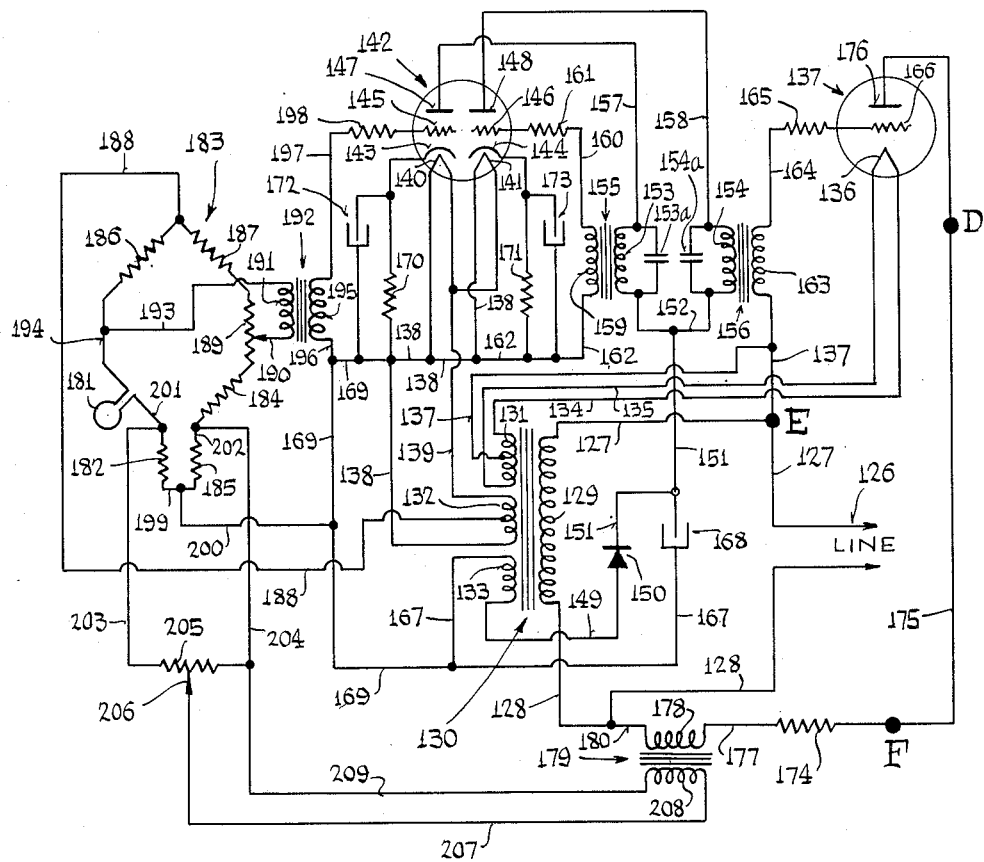
Fig. 3 is a schematic diagram of an automatic temperature control made in accordance with the invention, in which a bridge is coupled to the circuit of the thermionic tube without the use of the shutter-controlled galvanometer and light cell.
Fig. 4 is a schematic diagram showing an autotransformer and connections by which it may be incorporated in the circuit of Fig. 3 to enable heavier load currents to be handled by the thermionic tube.

Another automatic temperature control made in accordance with the invention is shown in Fig. 3, this temperature control differing from that of Fig. 1 in that no galvanometer or photocell is required, in that an A. C. bridge and phase-shifting mechanism is utilized, and in that control of the heater for the bath is effected directly by the Thyratron tube instead of by an intermediate autotransformer. In Fig. 3 a power line 126 has supply wires 127 and 128 connected with the primary 129 of a power transformer 130, said transformer having filament windings 131 and 132 and a plate supply winding 133.

The filament winding 131 is connected by wires 134 and 135 with the filament 136 of the Thyratron tube 137. A center tap on the winding 131 is connected by a wire 137 to the power supply wire 127. The filament winding 132 is connected by wires 138 and 139 respectively to heaters 140 and 141 of a twin triode tube 142 having cathodes 143 and 144, control grids 145 and 146 and anodes 147 and 148.

The plate supply winding 133 is connected by a wire 149 to a rectifier 150, the latter being connected by a wire 151 to a jumper 152 connected with the primaries 153 and 154 of amplifying transformers 155 and 156, said primaries being bridged by condensers 153a and 154a, and being connected by wires 157 and 158 respectively to the anodes 147 and 148 of the tube 142. The secondary 159 of the transformer 155 is connected by a wire 160 to a grid resistor 161 which is in turn connected to the control grid 146 of the tube 142. The transformer secondary 159 is connected by a wire 162 to the wire 138. The secondary 163 of the transformer 156 is connected by a wire 164 to a grid resistor 165 which is in turn connected to the control grid 166 of the tube 137. The power supply winding 133 of the transformer 130 is connected by a wire 167 to a filter condenser 168 which may have a capacity of approximately 50 microfarads. The cathode-anode circuit of the twin triode tube 142 is completed by a wire 169 connecting the wire 167 with the wire 138, and by cathode resistors 170 and 171 connecting cathodes 143 and 144 respectively to the wires 138 and 162. The resistors 170 and 171 may advantageously be of 400 ohms each, and may be shunted by filter condensers 172 and 173 of 40 microfarads each.

For supplying heat to the oil bath a heater 174 is provided, connected by a wire 175 to the anode 176 of the Thyratron tube 137 and by a wire 177 to the primary 178 of a transformer 179, said primary being connected by a wire 180 to the supply line 128.

In accordance with the invention the transformer 179 constitutes a potential take-off in the circuit of the heater 174 and forms part of an anticipator device to enable the oil bath to be held in a narrower temperature range, as will be more fully brought out later. Such anticipator device accomplishes in general the result of the anticipator described above in connection with Fig. 1.

It will be understood that with the circuit as above described the potentials normally on the control grids 145 and 146 of the twin triode tube 142 will cause both triodes of this tube to be conducting, and D. C. will flow in the anode circuits of this tube. Normally also the control grids 166 of the Thyratron tube 137 will have essentially zero potential with respect to the filament 136, and therefore the tube 137 will be conducting. This will connect the heater 174 for energization from the supply line 126, and when the Thyratron tube 137 is made nonconducting, as will be later explained, the heater 174 will be de-energized.

Immersed in the same bath with the heater 174 is a resistance bulb 181 constituting, with a resistor 182, one leg of an A. C. resistance bridge 183, said bridge having a symmetrical leg comprising resistors 184 and 185. The bridge 183 has two upper symmetrical legs comprising resistors 186 and 187 connected to a common wire 188 which connects with the center tap of the filament winding 132 of the transformer 130. The bridge 183 has a balancing resistor 189 connected between the resistors 184 and 187, said balancing resistor having a slider 190 connected to the primary coil 191 of a transformer 192, which coil is connected by a wire 193 with the opposite corner of the bridge, comprising the wire 194. The secondary 195 of the transformer 192 is connected by a wire 196 to the wire 169, and by a wire 197 to a grid resistor 198 which is connected to the control grid 145 of the twin triode 142.

In the bridge 183 the resistors 182 and 185 have a common jumper 199 connected by a wire 200 to the wire 169. Wires 201 and 202 connect the resistors 182 and 185 respectively to the resistance bulb 181 and the resistor 184. The wires 201 and 202 are connected by wires 203 and 204 to opposite ends of a resistor or potentiometer 205 which has a slider 206 connected by a wire 207 to the secondary 208 of the transformer 179, said secondary being connected by a wire 209 to the wire 204. It will be seen that the bridge 183 is A. C. energized through the wire 188 and the wires 200, 169, 138 from the transformer secondary 132. The resistors 182, 184, 185, 186, 187, 189 and 205 may have the following values respectively 10 ohms, 100 ohms, 10 ohms, 100 ohms, 100 ohms, 20 ohms and 10 ohms.

The resistor 205 constitutes part of the anticipator device of the circuit of Fig. 3, since in conjunction with the transformer 179 it alters the influence of the resistance bulb 181 on the bridge circuit 183 in such a manner as to prevent overshooting of the temperature when the heater 174 is being energized.

The coupling transformer 192 and the transformers 155 and 156 are preferably designed to saturate with but small excitation, and to normally operate in a condition of saturation. These three transformers and the condensers 153a and 154a function according to the invention, to phase-displace the alternating voltage which is impressed on the control grid 166 of the tube 137 when an unbalance of the bridge 183 exists, effecting a less abrupt current wave in the anode circuit of the tube 137 as will be later described.

Operation of the circuit of Fig. 3 is as follows: The Thyratron 137 is energized by alternating current from the line 126. The bridge 183 is energized by alternating current from the filament winding 132 of the transformer 130, said energization being supplied as described above. Assuming that the apparatus has been turned on and the oil bath brought up to heat, a balance of the bridge 183 may be established by adjustment of the slider 190 on the balancing resistor 189, and for such a balanced condition a second alternating potential will be applied to the bridge, this time by the transformer secondary 208 and through the wires 203 and 204, as will be explained shortly. The primary 191 of the transformer 192 obviously will not be energized when the bridge is in balance. A small negative bias will be established on the control grids 145 and 146 of the tube 142 by virtue of the cathode resistors 170 and 171. The tube 142 will be conducting, however, and will have only direct current in its anode circuits. The tube 137 will also be conducting due to the grid 166 exerting no control, and the heater 174 will be energized, heating the oil bath. When the temperature of the oil bath rises it will cause an increase in the resistance of the bulb 181, unbalancing the bridge 183 so that the transformer 192 will be energized to introduce to the control grid 145 of the tube 142 an alternating potential. This will be amplified by the tube 142 and impressed on the grid 166 of the tube 137. The impressed alternating potential on the grid 166 will be generally in opposition to the potential on the anode 176, so as to hold the tube nonconducting part of the time, and due to the effect of the transformers 192, 154 and 155 the condensers 153a and 154a, this grid potential is phase-displaced with respect to the anode energization, lagging said anode energization, such displacement being greater with a greater unbalance of the bridge 183, and lesser with a smaller bridge unbalance. For such condition, in any positive half-cycle of anode energization, the impressed potential on the grid 166 will be mostly negative and will delay the start of conduction of the tube 137 and cause said tube to be nonconducting during a small initial portion of said half cycle. Only during the latter portions of each positive half-cycle, therefore, will the tube 137 conduct. Also, the greater the bridge unbalance, the later in the positive half-cycles will the tube be made conducting, and vice versa. Thus in effect a continuous control is had in that the tube 137 is both nonconducting and conducting during each positive half-cycle of anode energization, the length of the intervals of nonconduction increasing with increased unbalance of the bridge, and vice versa, and such action characterizing the energization of the heater 174. Abrupt surges of large magnitude in the heater circuit are avoided, and the apparatus will tend to establish and closely maintain a given temperature of bath. Fig. 5 depicts in general the curves corresponding to the above condition. At the tube 137 the anode potential is A, the anode current for a balanced condition of the bridge is B, and the grid potential for a balanced bridge is zero, the grid curve corresponding to the axis O—O. When the bridge unbalances slightly due to the element 181 becoming hotter, the grid potential will follow the curve C, and the plate current corresponding to this will be abcd. For the tube 137 the critical grid curve is given at D; values more negative than shown by the curve D will not permit anode current to flow and values more positive will start conduction of the tube. Once the tube conducts, no increase in negative grid potential will cut off the tube while there is sufficient plate potential. Where a grid potential curve crosses the curve D during a positive half cycle of anode excitation, conduction of the tube will be started.

For a hotter bulb element 181, grid curve E will be produced, of greater magnitude than curve C, lagging curve A more than curve C, and effecting an anode current depicted by the curve aefd. A still hotter element 181 will result in grid potential curve, lagging A still more and effecting an anode current aghd. If the bulb 181 is made hotter yet, the grid potential will be as shown at G, lagging A by 180 degrees and preventing all conduction of the tube 137. In the circuit of Fig. 3 the A. C. of the supply 126 may be considered as a time base; it will be seen, then, that conduction of the tube 137 and energization of the heater 174 will occur for an interval in each positive wave of anode potential, the lengths of said intervals of conduction being a function of the degree of unbalance of the bridge and decreasing as the bridge becomes more unbalanced due to heating of the element 181.

From Fig. 5 it will be noted that when bridge unbalance is caused by the bulb being too hot, but not hot enough to shut off all anode current in the tube 137, the potential of the grid 166 (curves C, E or F) will be generally in opposition to the anode potential A and lagging said anode potential by a figure somewhat under 180 degrees, said lag decreasing as the bulb becomes cooler, due to less saturation in the cores of the transformers 155, 156 and 192.

The anticipator operation in connection with the above is as follows: The primary 178 of the transformer 179 is excited by intermittent direct current. When the tube 137 is conducting during a positive half-cycle of anode energization, a pulse or wave in one direction will be supplied to the bridge through the wires 203 and 204, and when the tube is nonconducting in a positive half-cycle, the transformer 179 will be de-energized, causing an opposite surge or wave to be supplied to the bridge. This latter will tend to re-establish balance to the bridge when it is unbalanced by temperature rise of the element 181, but will not wholly restore said balance. Accordingly as the de-energized heater 174 permits the temperature of the bulb 181 to drop, the bulb need not cool as much to restore the bridge balance and again energize the heater, as if the anticipator transformer 179 were not provided in the circuit. By the same token, whenever the tube 137 is made conducting, energizing the heater 174 and the transformer 179, the pulse or wave of the latter as impressed on the bridge 183 tends to restore the balance of the bridge just as if the element 181 were hotter than it actually is at the time. Therefore the bridge is influenced to shut off the heater 174 sooner and prevent overshooting of the temperature of the bath. The anticipator effect may be varied by changing the setting of the slider 206 without altering the state of balance or unbalance of the bridge 183 since the point of application of the alternating potential through the wires 203 and 204 does not change.

If opposite unbalance of the bridge 183 is caused by a cooling of the element 181, the potential H, Fig. 5, applied to the grid 166 will lag but will not be in opposition to the potential of the anode 176. Thus in each positive half-wave of anode potential a much longer interval of conduction of the tube 137 will be set up than when the unbalance is caused by the element heating, thereby tending to warm the bath and element 181 much more quickly. During initial heating of the bath, where the element 181 is very cool, a grid potential J, Fig. 5, will be obtained. For each of the potentials H and J the anode current will be B, since shut off of the tube 137 will occur only by the plate voltage dropping and not by the grid being made negative.

When the bridge 183 is in balance, the energization of the heater 174, curve B of Fig. 5, will be the same as for the unbalanced condition described immediately above, and accordingly it will be more than for the opposite unbalance first described.

The grid potentials represented by the curves in Fig. 5 may be readily controlled to give the desired result by controlling the anode potentials on the tube 142, as by a resistor 219a inserted in the wire 149.

As is shown in Fig. 1, an autotransformer may be incorporated in the anode circuit of the Thyratron tube 137 to enable heavier load currents to be controlled by said tube. In Fig. 4 a schematic diagram of an autotransformer 220 is shown, the ends of the terminals of the transformer 220 being connected by wires 221 and 222 to terminals E and D respectively, and a tap 223 on the transformer being connected by a wire 224 to a terminal F. In Fig. 3 disconnect terminals D and F are provided in the wire 175, and a terminal E is indicated in the wire 127, and these three terminals may be connected to the similarly designated terminals in Fig. 4, omitting the portion of the wire 175 between the terminals D and F. For such connections, the autotransformer 220 will have its circuit controlled by the Thyratron tube 137 and energization of the heater 174 will be effected in the same manner as described in connection with Fig. 1.

Variations and modifications may be made within the scope of the claims and portions of the improvements may be used without others.

I claim:

1. In an automatic electrically-operated device for effecting a continuous temperature control, a circuit control; a variable element reversibly responding to increases and decreases in its temperature; means controlled by said element, for operating the circuit control in one sense when the temperature of the element attains a predetermined high value and in the opposite sense when the temperature of the element drops to a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element, an electric heater in heat-exchanging relation to the variable element and an energizing circuit for the heater, and an autotransformer connected to the circuit control and having a portion of its winding connected in the energizing circuit for the heater to control the energization of the latter.

2. In an automatic electrically-operated device for effecting a continuous temperature control, a circuit control including a vacuum tube; a variable element reversibly responding to increases and decreases in its temperature; means controlled by said element, for operating the circuit control in one sense when the temperature of the element attains a predetermined high value and in the opposite sense when the temperature of the element drops to a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element, an electric heater in heat-exchanging relation to the variable element and an energizing circuit for the heater, and an autotransformer connected in the anode circuit of the vacuum tube in the control circuit, and having a portion of its winding connected in the energizing circuit for the heater to control the energization of the latter.

3. In an automatic electrically-operated device for effecting a continuous temperature control, a circuit control operable in reverse senses to open and close a circuit; an electric heater and means connecting the heater to the circuit control to be controlled thereby; a variable element reversibly responding to increases and decreases in its temperature located in heat-exchanging relation with the heater; means controlled by said element, for operating the circuit control to reduce heating of the heater when the temperature of the element is at a predetermined high value and to increase heating of the heater when the temperature of the element is at a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element, a power circuit for the heater controlled by the circuit control, and in which the anticipator means includes a transformer in the power circuit, having a winding connected with the circuit-control operating means.

4. In an automatic electrically-operated device for effecting a continuous temperature control, a circuit control operable in reverse senses to open and close a circuit; an electric heater and means connecting the heater to the circuit control to be controlled thereby; a variable element reversibly responding to increases and decreases in its temperature located in heat-exchanging relation with the heater; means controlled by said element, for operating the circuit control to reduce heating of the heater when the temperature of the element is at a predetermined high value and to increase heating of the heater when the temperature of the element is at a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element, a power circuit for the heater controlled by the circuit control, in which the means operating the circuit control comprises a bridge circuit including resistors in adjacent legs having a common connection, in which the anticipator means includes a transformer in the power circuit, having a winding connected to the said resistors of the bridge circuit, and in which there is means for adjusting the anticipator means, including a potentiometer connected between the resistors and transformer winding.

5. In an automatic electrically-operated device for effecting a continuous temperature control, a circuit control; a variable element reversibly responding to increases and decreases in its temperature; means controlled by said element for operating the circuit control in one sense when the temperature of the element attains a predetermined high value and in the opposite sense when the temperature of the element drops to a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element; in which the means operating the circuit control comprises a bridge circuit unbalance of which operates the circuit control in the said one sense and in which the anticipator means when operative reduces the amount of unbalance of the bridge circuit; a vacuum tube relay connected between the bridge circuit and the circuit control; the anticipator means comprises an anticipator resistor inserted in one leg of the bridge circuit and connected to the cathode-anode circuit of the vacuum tube relay; and means operatively associated with the bridge circuit for adjusting the anticipator means by varying equally the energization of the bridge circuit without disturbing the balance or degree of unbalance of the bridge circuit.

6. The invention as described in claim 5 in which the anticipator adjusting means comprises a resistor inserted in another leg of the bridge circuit adjacent the leg having the anticipator resistor and comprises means for simultaneously varying the said resistors.

7. In an automatic electrically-operated device for effecting a continuous temperature control, a circuit control; a variable element reversibly responding to increases and decreases in its temperature; means controlled by said element for operating the circuit control in one sense when the temperature of the element attains a predetermined high value and in the opposite sense when the temperature of the element drops to a predetermined low value; anticipator means automatically operative only whenever the circuit control is operated by said element in one sense, for temporarily altering the control of said circuit-control operating means by said element until the latter causes opposite operation of the circuit control, said anticipator means causing said opposite operation to occur at a temperature of the element between the said predetermined high and low values, thereby to narrow the operating temperature range of said element; in which the means operating the circuit control comprises an energized circuit connected to the variable element and the anticipator means when operative alters the energization of said circuit; a relay controlling the circuit control; in which the energized circuit includes a trigger means for actuating the relay; and means operatively connected to the energized circuit for adjusting the anticipator means by varying equally the energization of the energized circuit without operating the said trigger means.

References Cited in the file of this patent
UNITED STATES PATENTS

| | | |
|---|---|---|
| 1,776,901 | Essey et al. | Sept. 30, 1930 |
| 2,246,575 | Coleman | June 24, 1941 |
| 2,426,711 | Shaffer | Sept. 2, 1947 |
| 2,487,556 | Jenkins | Nov. 8, 1949 |
| 2,488,580 | Burleigh | Nov. 29, 1949 |
| 2,544,031 | Kyle | Mar. 6, 1951 |
| 2,602,916 | Anderson | July 8, 1952 |
| 2,651,704 | Prior | Sept. 8, 1953 |